(12) United States Patent  
Atmur et al.

(10) Patent No.: US 11,964,431 B2  
(45) Date of Patent: Apr. 23, 2024

(54) LASER-BASED MANUFACTURING WITH OPTICAL CORRECTION

(71) Applicant: THE BOEING COMPANY, Chicago, IL (US)

(72) Inventors: Robert J. Atmur, Huntington Beach, CA (US); Jeffrey H. Hunt, El Segundo, CA (US)

(73) Assignee: THE BOEING COMPANY, Chicago, IL (US)

( * ) Notice: Subject to any disclaimer, the term of this patent is extended or adjusted under 35 U.S.C. 154(b) by 197 days.

(21) Appl. No.: 17/363,503

(22) Filed: Jun. 30, 2021

(65) Prior Publication Data

US 2022/0161493 A1 May 26, 2022

Related U.S. Application Data

(60) Provisional application No. 63/116,465, filed on Nov. 20, 2020.

(51) Int. Cl.
*B29C 64/273* (2017.01)
*B23K 26/00* (2014.01)
(Continued)

(52) U.S. Cl.
CPC ........ *B29C 64/273* (2017.08); *B23K 26/0006* (2013.01); *B23K 26/032* (2013.01);
(Continued)

(58) Field of Classification Search
None
See application file for complete search history.

(56) References Cited

U.S. PATENT DOCUMENTS

| 4,543,486 A | 9/1985 | Rose |
| 7,835,873 B2 | 11/2010 | Hlavaty |

(Continued)

FOREIGN PATENT DOCUMENTS

| JP | H0665808 U | 3/1994 |
| JP | 4499246 B2 | 7/2010 |
| JP | 4499246 B2 * | 7/2010 |

OTHER PUBLICATIONS

Extended European Search Report dated Apr. 13, 2022 issued in corresponding EP Application No. 21206436.4, pp. 1-7.

(Continued)

*Primary Examiner* — John J Norton

(74) *Attorney, Agent, or Firm* — Moore Intellectual Property Law, PLLC

(57) ABSTRACT

A method of forming an object from a material includes directing a first beam of light toward a first target location of the material to define a first portion of the object. The method also includes, after directing the first beam of light toward the first target location, determining an optical correction to be applied by an optical system. The optical correction is based on an atmospheric change in an atmospheric distortion region proximate the first target location due, at least in part, to interaction of the first beam of light and the material. The method further includes directing a second beam of light toward a second target location of the material to define a second portion of the object. The second (Continued)

beam of light is directed through at least a portion of the atmospheric distortion region while the optical correction is applied.

20 Claims, 8 Drawing Sheets

(51) Int. Cl.
| | |
|---|---|
| *B23K 26/03* | (2006.01) |
| *B23K 26/046* | (2014.01) |
| *B23K 26/06* | (2014.01) |
| *B23K 26/0622* | (2014.01) |
| *B23K 26/064* | (2014.01) |
| *B23K 26/342* | (2014.01) |
| *B23K 26/36* | (2014.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ........ *B23K 26/046* (2013.01); *B23K 26/0604* (2013.01); *B23K 26/0622* (2015.10); *B23K 26/064* (2015.10); *B23K 26/0643* (2013.01); *B23K 26/0648* (2013.01); *B23K 26/342* (2015.10); *B23K 26/36* (2013.01); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 7,978,313 B2 | 7/2011 | Guthrie |
| 8,547,225 B2 | 10/2013 | Tillotson |
| 9,503,696 B2 | 11/2016 | Tillotson |
| 10,009,101 B2 | 6/2018 | Everett et al. |
| 10,272,525 B1 * | 4/2019 | Buller .................... B33Y 30/00 |
| 2019/0329356 A1 * | 10/2019 | Zhang .................... B33Y 10/00 |
| 2021/0091854 A1 * | 3/2021 | Uyeno ................. G02B 6/3512 |

OTHER PUBLICATIONS

Chen et al., "Engineering the Phase Front of Light with Phase-Change Material Based Planar Lenses", Scientific Reports, Published Mar. 2, 2015, pp. 1-7.

\* cited by examiner

LASER-BASED MANUFACTURING WITH OPTICAL CORRECTION

CROSS-REFERENCE TO RELATED APPLICATIONS

The present application claims the benefit of priority from the commonly owned U.S. patent application Ser. No. 63/116,465 entitled "LASER-BASED MANUFACTURING WITH OPTICAL CORRECTION," filed Nov. 20, 2020, the contents of which are expressly incorporated herein by reference in their entirety.

FIELD OF THE DISCLOSURE

The present disclosure is generally related to laser-based manufacturing using optical correction.

BACKGROUND

Lasers are used in many manufacturing processes. For example, in various manufacturing processes, a laser can be used to heat a material, to promote curing of a material, to fuse or weld materials, to cut materials, etc. In most of these use cases, a beam of light emitted by a laser device needs to be focused fairly carefully on a target location in order to achieve a desired effect.

Heating a material using a beam of light from a laser device may cause a portion of the material to vaporize or off-gas, which can cause differences in refractive indexes between the laser device and the material. The beam of light typically provides very localized heating of the material. The localized heating can result in significant temperature differences along the path that the beam of light traverses between the laser device and the material. Such temperature differences (or associated density differences) can cause a refractive index of the atmosphere to vary along the path that the beam of light traverses. The differences in refractive index along the path cause distortion of the beam of light, which can defocus the beam of light or cause other issues that limit energy of the beam of light that is imparted to the target location.

SUMMARY

In a particular implementation, a system for forming an object from a material includes one or more laser devices configured to direct light toward the material to modify the material to define portions of the object. The system also includes an optical system coupled to the one or more laser devices and configured to perform optical correction of the light. The system further includes a controller coupled to the optical system and configured to, after the one or more laser devices direct one or more first beams of light toward a first target location of the material to define a first portion of the object, determine an optical correction to be applied by the optical system. The optical correction is based on an atmospheric change in an atmospheric distortion region proximate the first target location due, at least in part, to interaction of the one or more first beams of light and the material. The controller is further configured to cause the optical system to apply the optical correction to a second beam of light from the one or more laser devices. The second beam of light is directed through at least a portion of the atmospheric distortion region toward a second target location on the material to define a second portion of the object.

In another particular implementation, a method of forming an object from a material includes directing a first beam of light toward a first target location of the material to define a first portion of the object. The method also includes, after directing the first beam of light toward the first target location, determining an optical correction to be applied by an optical system. The optical correction is based on an atmospheric change in an atmospheric distortion region proximate the first target location due, at least in part, to interaction of the first beam of light and the material. The method further includes directing a second beam of light toward a second target location of the material to define a second portion of the object. The second beam of light is directed through at least a portion of the atmospheric distortion region while the optical correction is applied.

The features, functions, and advantages described herein can be achieved independently in various implementations or may be combined in yet other implementations, further details of which can be found with reference to the following description and drawings.

DETAILED DESCRIPTION

Figure 1:
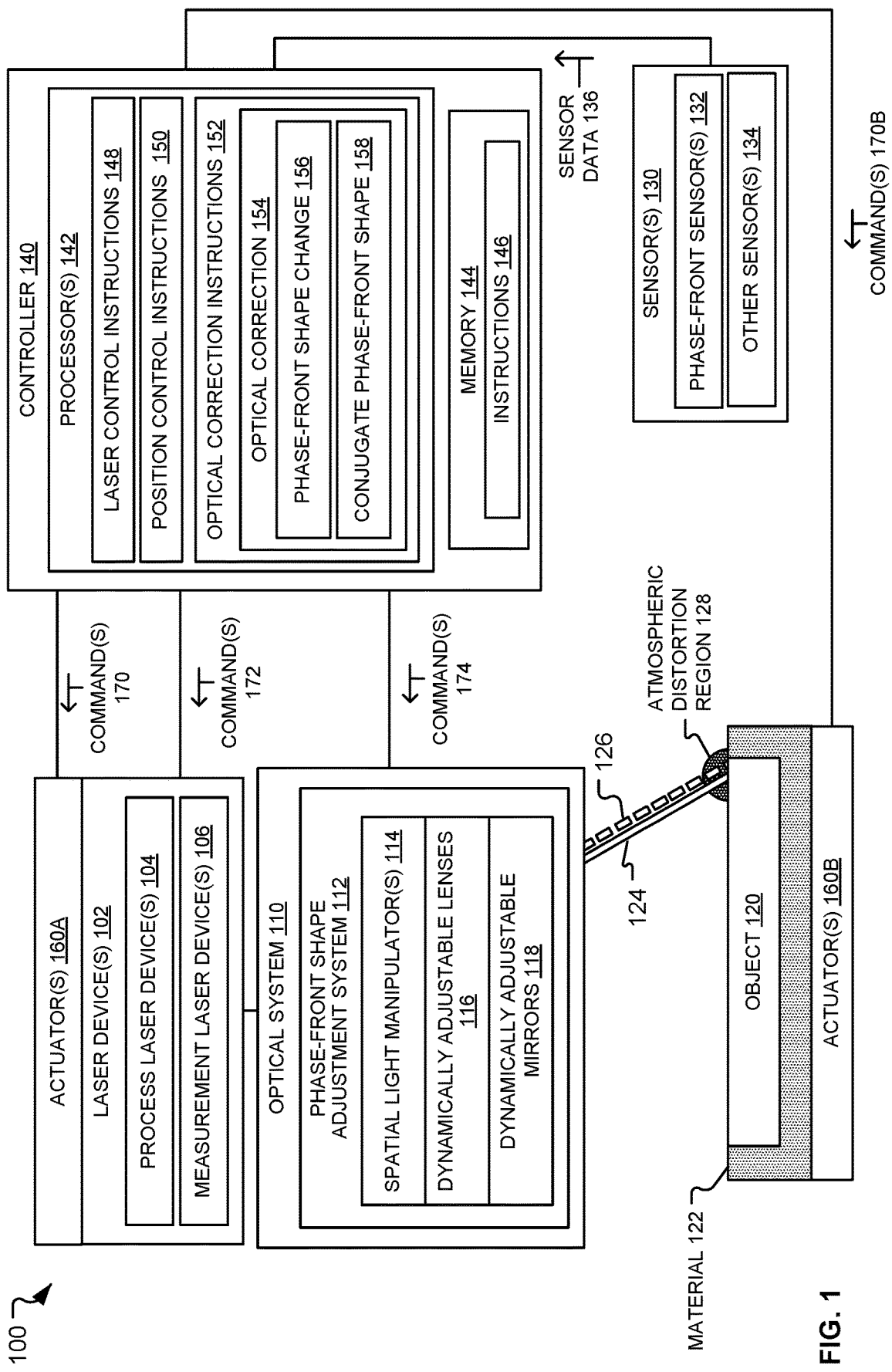
FIG. 1 is a diagram that illustrates a system for laser-based fabrication of an object using optical correction according to a particular implementation.

Aspects disclosed herein use optical correction to facilitate laser-based manufacturing. The optical correction is provided via an optical system that is configured to pre-distort a beam of light to account for atmospheric distortion along a path between a laser device and a target location on a material used in the manufacturing operation. For example, the atmospheric distortions can cause phase-front shape changes in a beam of light directed along the path, and the optical system can pre-distort the beam of light to counteract or limit effects of the phase-front shape change. To illustrate, the optical system can apply a conjugate phase-front shape to the beam of light so that when the beam of light with the conjugate phase-front shape passes through the optical distortion, the phase-front shape change induced by the optical distortion counteracts the conjugate phase-front shape change, enabling a well-focused and substantially planar phase-front of the beam of light to reach the target location.

The optical correction may be determined and applied dynamically. For example, when a beam of light interacts with a material at a first target location, the beam of light may cause some desired process effect (e.g., fusing portions of the material or removing portions of the material) and introduce optical distortions in a region near the first target location. In particular implementations, the optical correction is determined after the first beam of light causes the optical distortions, and the optical correction is applied to a subsequent beam of light as the subsequent beam of light is directed toward a second target location. Thus, optical correction(s) applied at a first time during a process of manufacturing an object may be different from optical correction(s) applied at a second time during the process of manufacturing the object. Applying the optical corrections enables a laser device to target adjacent regions of the object or a material used to form the object in contiguous time periods (e.g., back-to-back process steps). For example, a beam of light can be directed toward a first target location, resulting in formation of an atmospheric distortion region near the first target location. In a next processing step, a second beam of light can be directed toward a second target location, where the second target location is adjacent to the first target location. In this example, the second beam of light passes through at least a portion of the atmospheric distortion region caused by the first beam of light, but effects of the atmospheric distortion region are reduced due to the optical correction.

In contrast to using optical correction as disclosed herein, the optical distortion cause by a first beam of light can be avoided. For example, the second beam of light could be directed to a target location that is remote from the first target location so that the second beam of light does not pass through (or passes through little of) the atmospheric distortion region caused by the first beam of light. Retargeting the laser device to point to second target location that is remote from the first target location increases manufacturing time because retargeting in this manner entails significant movement to change the relative positions of the material and the target location of the laser device between each process step. As another example of avoiding the optical distortion caused by a first beam of light, the second beam of light can be applied after a delay that allows the atmospheric distortion region to dissipate. This example also increases manufacturing time due to the delay time added between the process steps.

As another contrast to using optical correction as disclosed herein, the optical distortion caused by a first beam of light can be overpowered. For example, the power output of the laser device can be increased sufficiently that the heat applied to each target location is at least sufficient to cause the desired effect. Increasing the power output in this manner is inefficient. Further, as the power output of the laser device increases, the beam of light emitted by the laser device may cause even more optical distortions. Additionally, the power output of the laser device may be limited due to properties of the material being used.

The optical correction disclosed herein can be applied instead of, or in addition to, other operations to avoid or overpower optical distortions in a laser-based manufacturing process. When used instead of avoiding or overpowering the optical distortion, the optical corrections disclosed herein enable more efficient and faster (e.g., higher throughput) manufacturing processes. When used in combination with avoiding the optical distortion, the optical corrections disclosed herein reduce delays associated with retargeting by allowing a second beam of light to pass through more of the atmospheric distortion region causes by a first beam of light without impacting manufacturing outcomes. When used in combination with overpowering the optical distortion, the optical corrections disclosed herein reduce the amount of overpowering used to overpowering the atmospheric distortion region. Thus, the adaptive optical correction disclosed herein can reduce or eliminate a waiting period between process steps while improving spot size and phase-front performance of the laser system.

The figures and the following description illustrate specific examples. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, one or more actuators 160A and one or more actuators 160B are shown. When referring to a particular one, or a particular set, of these actuators, such as the actuator(s) 160A, the distinguishing letter "A" is used. However, when referring to any arbitrary one of these actuators or to these actuators as a group, the reference number 160 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more laser devices ("laser device(s) 102 in FIG. 1), which indicates that in some implementations the system 100 includes a single laser device 102 and in other implementations the system 100 includes multiple laser devices 102. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 for laser-based fabrication of an object 120 using optical correction according to a particular implementation. The system 100 includes one or more laser devices 102, such as one or more process laser devices 104 and one or more measurement laser devices 106. As used herein, a process laser device 104 refers to a laser device that is configured to direct a beam of light (e.g., beam 126 in FIG. 1) toward a material 122 to modify the material 122 to define portions of the object 120. A measurement laser device 106 refers to a laser device that is configured to direct a measurement beam of light (e.g., beam 124 in FIG. 1) toward an atmospheric distortion region 128 to measure or sense characteristics of optical distortion within the atmospheric distortion region 128.

Figure 2:
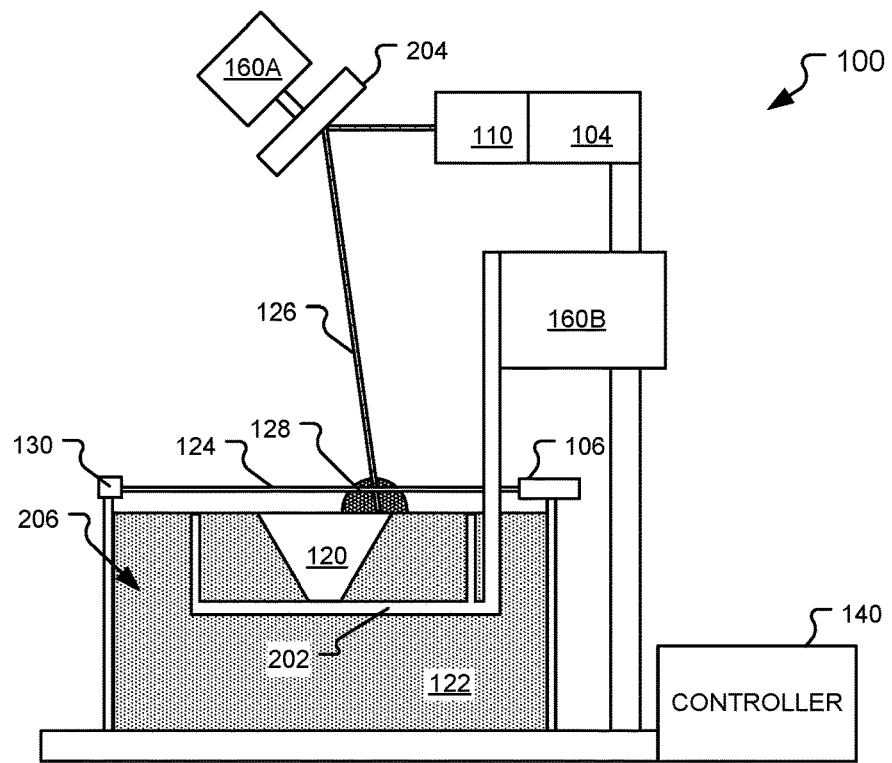
FIG. 2 is a diagram that illustrates a first example of the system of FIG. 1 for an additive manufacturing system.
Figure 3:
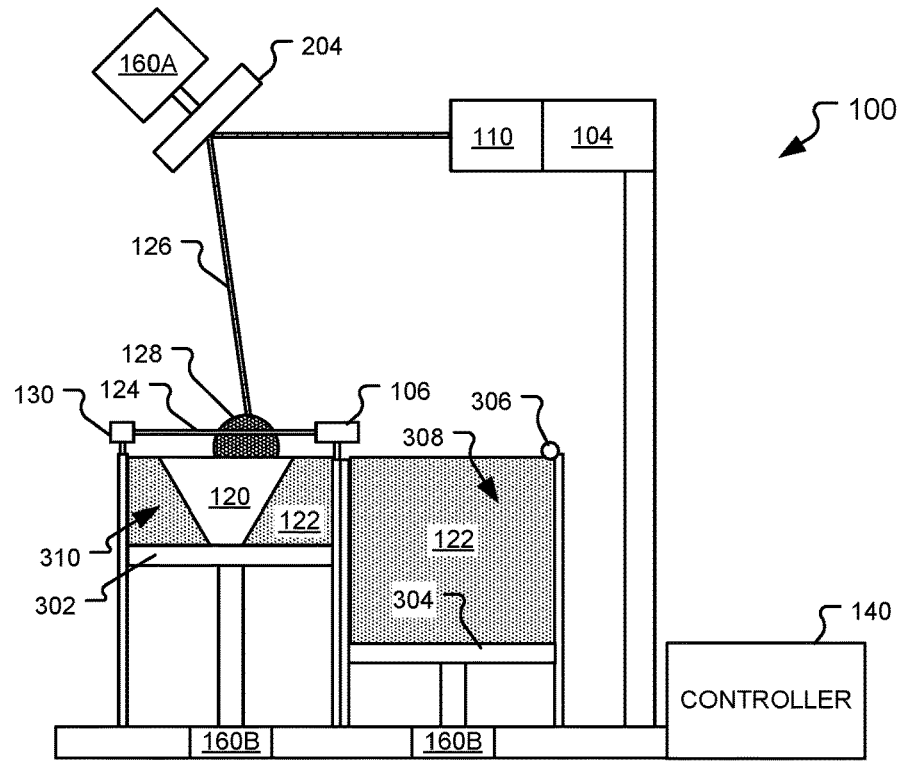
FIG. 3 is a diagram that illustrates a second example of the system of FIG. 1 for an additive manufacturing system.
Figure 5:
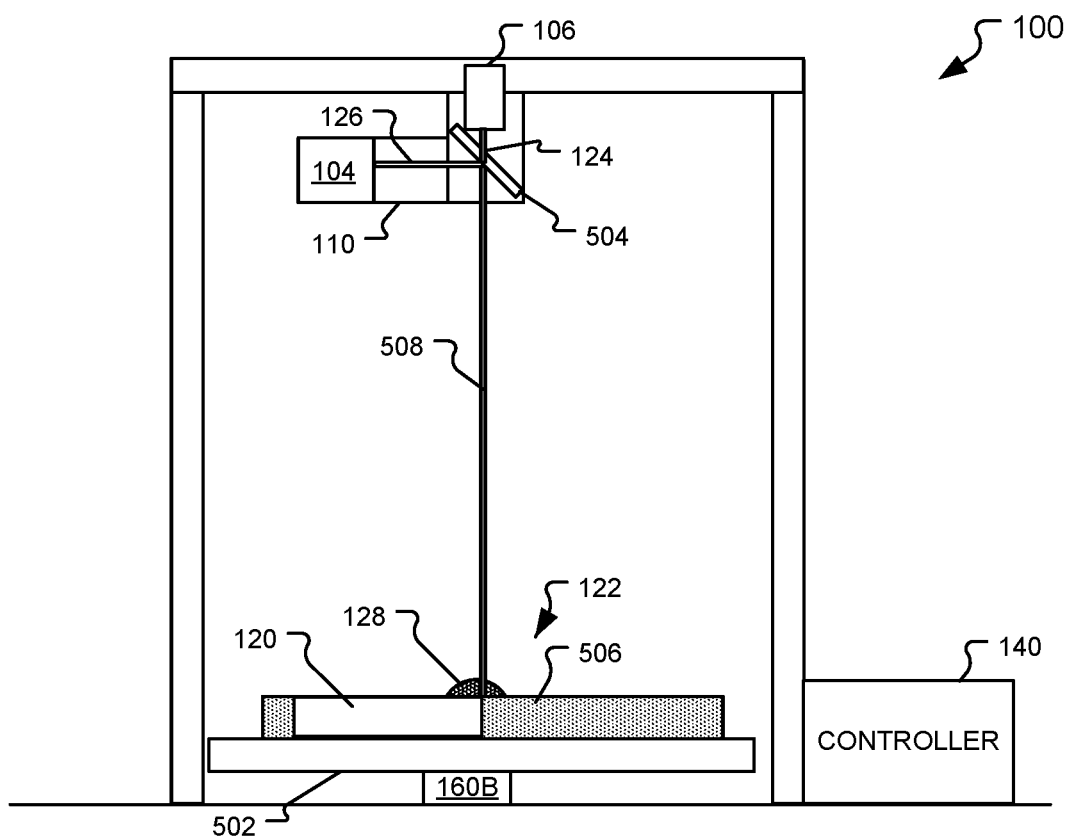
FIG. 5 is a diagram that illustrates an example of the system of FIG. 1 for a subtractive manufacturing system.

In the example illustrated in FIG. 1, the beam 126 and the beam 124 are illustrated as directed along substantially parallel paths. In other examples, the beam 126 and the beam 124 are coincident (e.g., as illustrated in the example of FIG. 5). And in still other examples, the beam 126 and the beam 124 are directed along separate, non-parallel paths (e.g., as illustrated in the examples of FIGS. 2 and 3).

The beam 124 has one or more beam characteristics distinct from the beam 126. For example, the beam 124 may differ from the beam 126 in wavelength, intensity, focal point, duty cycle, beam power, beam shape, pulse characteristics, or a combination thereof. In one example, the beam 126 has a first wavelength and the beam 124 has a second wavelength that is shorter than the first wavelength. To illustrate, the beam 126 from the process laser device(s) 104 may have a wavelength within an infrared spectrum, and the beam 124 from the measurement laser device(s) 106 may have a shorter wavelength to provide fine measurement of optical distortion. In another example, the beam 126 is a pulsed beam (e.g., to provide fine manufacturing control and retargeting between pulses), and the beam 124 is a continuous beam (e.g., to provide continuous or near continuous sampling of the optical distortions). In still another example, the beam 126 is pulsed at a first rate that is based on manufacturing criteria (e.g., to regulate object formation and interaction of the beam 126 with the material 122), and the beam 124 is pulsed at a second rate that is independent of the first rate. To illustrate, the second rate may be determined based on sampling or measurement criteria (e.g., to sample of the optical distortions at a rate based on how quickly the optical distortions change). In yet another example, the beam 124 may be pulsed at a first rate, and the beam 126 may be pulsed at the same rate. To illustrate, in a particular implementation, a pulse of the beam 124 may be directed toward the atmospheric distortion region to sample the optical distortions just before a pulse of the beam 126 is directed toward the material 122. In this particular implementation, the pulse of the beam 124 is used to adjust the optical system 110 to pre-distort light of the pulse of the beam 126. Thus, in this particular implementation, the optical system 110 may be adjusted between each pulse of the beam 126. Alternatively, the optical system 110 can be adjusted after N pulses of the beam 126, where N is an integer greater than 1.

Beam characteristics of the beam 126 are selected to facilitate fabrication. For example, the beam characteristics of the beam 126 may be selected based on the material 122 and a manufacturing process used to form the object 120. As a first illustrative example, if the system 100 is used for an additive manufacturing process, the beam characteristics of the beam 126 may be selected to enable the beam 126 to selectively cure or solidify the material 122 or to fuse, adhere, sinter, or weld adjacent particles of the material 122 to form a portion of the object 120. As a second illustrative example, if the system 100 is used for a subtractive manufacturing process, the beam characteristics of the beam 126 may be selected to enable the beam 126 to selectively melt, sublimate, vaporize, ablate, or otherwise remove portions of the material 122 such that remaining portions of the material 122 define a portion of the object. Interaction of the beam 126 and the material 122 causes atmospheric change in an atmospheric distortion region 128 proximate to a target location of the beam 126. For example, the atmospheric change can result in local variation of an atmospheric index of refraction within the atmospheric distortion region 128.

Beam characteristics of the beam 124 are selected to facilitate measurement of optical distortion in the atmospheric distortion region 128 without adversely impacting the manufacturing process. For example, the beam characteristics of the beam 124 may be selected based on availability of sensors 130 to detect the beam 124 and to determine sensor data 136 indicative of optical distortion in the atmospheric distortion region 128. As another example, when the beam 124 and the beam 126 are coincident, the wavelength of the beam 124 may be sufficiently distinct from the wavelength of the beam 126 to enable accurate detection of the beam 124 by the sensor(s) 130.

In addition to the laser devices(s) 102, the system 100 includes an optical system 110 that is coupled to the laser device(s) 102 and configured to perform optical correction of light output by the laser device(s) 102. For example, the optical system 110 may include a phase-front shape adjustment system 112 that is configured to modify a phase-front shape of the beam 126 emitted by the process laser device(s) 104. Examples of mechanisms that can be used to adjust the phase-front shape include one or more spatial light manipulators 114, one or more dynamically adjustable lenses 116, one or more dynamically adjustable mirrors 118. In FIG. 1, the phase-front shape adjustment system 112 is illustrated as includes spatial light manipulator(s) 114, dynamically adjustable lens(es) 116, and dynamically adjustable mirror(s) 118. In other implementations, the phase-front shape adjustment system 112 includes only two of the spatial light manipulator(s) 114, dynamically adjustable lens(es) 116, and dynamically adjustable mirror(s) 118. In still other implementations, the phase-front shape adjustment system 112 includes only one of the spatial light manipulator(s) 114, dynamically adjustable lens(es) 116, and dynamically adjustable mirror(s) 118.

The system 100 further includes a controller 140 coupled to the laser device(s) 102, to the optical system 110, or to both. The controller 140 is configured to determine the optical correction 154 to be applied by the optical system 110. Additionally, the controller 140 may be configured to control activation of the laser device(s) 102, aiming of light emitted by the laser device(s) 102, relative positions of the laser device(s) 102 and the material 122 (e.g., via one or more actuators 160), activation of one or more sensors 130, other aspects of performing manufacturing using the system 100, or any combination thereof.

The system 100 also includes the one or more sensors 130 that are configured to generate the sensor data 136 indicative of atmospheric change in the atmospheric distortion region 128 that is due, at least in part, to interaction of the beam 126 and the material 122. The sensor(s) 130 include one or more phase-front sensors 132, one or more other sensors 134 configured to generate the sensor data 136 indicative of atmospheric change in the atmospheric distortion region 128, or both. The phase-front sensor(s) 132 are configured to measure a phase-front shape of the beam 124 after the beam 124 passes through at least a portion of the atmospheric distortion region 128 and generate the sensor data 136 based on the measured phase-front shape. The other sensor(s) 134 are configured to detect conditions that are correlated with particular atmospheric distortion characteristics. To illustrate, the other sensor(s) 134 may be configured to detect local temperature changes in the atmospheric distortion region (or a surrounding region), the presence or concentration of chemical constituents in the atmospheric distortion region (or a surrounding region), etc.

Whether the sensor(s) 130 include the phase-front sensor(s) 132, the other sensor(s) 134, or a combination thereof, the sensor data 136 includes information that the controller 140 uses to determine the optical correction 154 to be applied by the optical system 110. In FIG. 1, the controller 140 includes one or more processors 142 and memory 144. The memory 144 includes or corresponds to one or more non-transitory memory devices that are configured to store data and instructions 146. The instructions 146 are executable by the processor(s) 142 to perform various operations described with reference to the controller 140, such as determining the optical correction 154 to be applied by the optical system 110 or controlling other operations of the system 100. In the example illustrated in FIG. 1, the instructions 146 correspond to or include laser control instructions 148, position control instructions 150, and optical correction instructions 152.

The laser control instructions 148 are executable by the processor(s) 142 to generate commands 172 to activate, deactivate, or change an operational characteristic of one or more of the laser device(s) 102. The commands 172 control operation of the laser device(s) 102 by indicating timing, beam characteristics, pointing direction, or other aspects of light output by the laser device(s) 102.

The position control instructions 150 are executable by the processor(s) 142 to generate commands 170 to actuators 160 of the system 100. In FIG. 1, the actuators 160 of the system 100 include actuators 160A associated with the laser device(s) 102 and/or the optical system 110, and actuators 160B associated with material handling and object movement. In other implementations, the system 100 includes more actuators 160 or fewer actuators 160. In a particular implementation, such as the example illustrated in FIG. 2, the actuator(s) 160A are coupled to a targeting mirror to facilitate aiming of one or more of the beams 124, 126. In other examples, the actuator(s) 160A reorient the laser device(s) 102 and/or the optical system 110 to aim the beam(s) 124, 126. In some implementations, one or more of the beams 124, 126 are directed along a fixed path, and the actuator(s) 160B move the material 122, the object 120, or both, relative to the beam(s) 124, 126. The actuator(s) 160B may also, or alternatively, be configured to perform other operations, such as feeding a quantity of the material 122 into a processing area.

In the particular embodiment illustrated in FIG. 1, the optical correction instructions 152 are executable by the processor(s) 142 to determine the optical correction 154 to be applied by the optical system 110 to light emitted by one or more of the laser device(s) 102. The optical correction 154 is configured to correct for atmospheric distortion in the atmospheric distortion region 128 in order to improve targeting of or effectiveness of light emitted by the process laser devices 104 (e.g., the beam 126).

The optical correction 154 is determined based on a measured, detected, or estimated, phase-front shape change 156 associated with the atmospheric distortion region 128. The phase-front shape change 156 indicates how a phase-front of the beam 126 is expected to be changed by passing through the atmospheric distortion region 128. In some implementations, the phase-front shape change 156 is determined based on how the phase-front of a measurement beam of light (e.g., the beam 124) from the measurement laser device(s) 106 is modified by passing through at least a portion of the atmospheric distortion region 128. In the particular example illustrated in FIG. 1, the measurement laser device(s) 106 and the process laser device(s) 104 are collocated, and both passed through the optical system 110. In this implementation, the beam(s) 124 and 126 are coincident. In other implementations, light from the measurement laser device(s) 106 does not pass through the optical system 110. To illustrate, in the example illustrated in FIG. 5, the beams 124, 126 are coincident and form a consolidated beam 508; however, the beam 124 does not pass through the optical system 110. In still other examples, such as in the example illustrated in FIG. 2, the process laser device(s) 104 and the measurement laser device(s) 106 are not collocated and the beams 124, 126 are not coincident. For example, the beam 124 passes through the atmospheric distortion region 128 in a different direction than the beam 126. In such implementations, the controller 140 includes calibration data (e.g., calibration data 942 of FIG. 9) to account for the difference in orientation and position of the process laser device(s) 104 and the measurement laser device(s) 106.

During operation, the controller 140 generates the commands 170 to cause the actuators 160 control relative positions and pointing directions of the laser device(s) 102 and the material 122. In some implementations, the commands 170B also prepare the material 122 for a manufacturing processes, such as by placing a portion of the material 122 in a processing location. In a particular aspect, the position control instructions 150 generate the commands 170 to cause the laser device(s) 102 to be aimed toward a first target location of the material 122. The position control instructions 150 may determine the commands 170 based on information received from another device or information stored in the memory 144. For example, the controller 140 may receive machine instructions (e.g., G-code or computer-numerical code instructions) from a remote computing device. In this example, the machine instructions indicate operations to be performed to form the object 120, typically in a layer-by-layer process. To illustrate, a three-dimensional (3D) computer model of the object 120 may be processed by a slicer application to represent the 3D computer model as a set of discrete layers, and tool paths or other machine instructions may be generated based on the set of discrete layers. In some implementations, the controller 140 includes the 3D computer model and the slicer application. In other implementations, another device includes the 3D computer model and the slicer application, and the controller 140 determines the commands 170 based on the machine instructions received from the other device.

When the laser device(s) 102 are correctly targeted (e.g., pointed toward a first target location of the material 122), the controller 140 sends the command(s) 172 to cause the process laser device(s) 104 to direct a first beam of light (e.g., the beam 124) toward the first target location to define a first portion of the object 120. Before, during, or after, the process laser device(s) 104 emit the first beam of light, the controller 140 may also send the command(s) 172 to cause the measurement laser device(s) 106 to direct a measurement beam of light (e.g., the beam 126) toward a region proximate to the first target location (e.g., toward the atmospheric distortion region 128 or toward an expected location of the atmospheric distortion region 128).

The first beam 126 of light from the process laser device(s) 104 interacts with a portion of the material 122 at the first target location to define a portion of the object 120. For example, the beam 126 may ablate, melt, vaporize, or otherwise remove a portion of the material 122 if the system 100 is performing a subtractive manufacturing process. As another example, the beam 126 may cure (e.g., initiate cross-linking), adhere, bind, or otherwise fuse together portions of the material 122 if the system 100 is performing an additive manufacturing process.

In addition to defining a portion of the object 120, interaction of the first beam of light and the material 122 may cause an atmospheric change in the atmospheric distortion region 128, which is proximate the first target location. The atmospheric change results in local variation of an atmospheric index of refraction within the atmospheric distortion region 128. If uncorrected, this local variation of an atmospheric index of refraction would distort (e.g., defocus) a second beam 126 of light directed through the atmospheric distortion region 128.

The sensor(s) 130 generate the sensor data 136 indicative of the atmospheric distortion in the atmospheric distortion region 128. For example, the measurement laser device(s) 106 emit the beam 124 in a direction that causes the beam 124 to pass through at least a portion of the atmospheric distortion region 128. In some implementations, the sensor(s) 130 detect the beam 124 and generate the sensor data 136 as an indication of characteristics of the optical distortion caused by the atmospheric distortion region 128. For example, the phase-front sensors 132 may generate sensor data 136 indicative of a shape of a phase front of the beam 124 or a phase-front change experienced by the beam 124. As another example, the other sensors 134 may generate sensor data 136 indicating a local temperature in the atmospheric distortion region 128, chemical constituents in the atmospheric distortion region 128, optical irregularities in the atmospheric distortion region 128, or a combination thereof.

The controller 140 uses the sensor data 136 to determine the optical correction 154. In the particular example illustrated in FIG. 1, the optical correction 154 is determined by estimating or calculating the phase-front shape change 156 that is expected to affect a subsequent beam 126 of light passing through the atmospheric distortion region 128. In this example, the phase-front shape change 156 is used to calculate a conjugate phase-front shape 158. The conjugate phase-front shape 158 is used to generate commands 174 provided to the optical system 110. The optical system 110 adjusts the phase-front shape adjustment system 112 based on the conjugate phase-front shape 158.

The process laser device(s) 104 direct a second beam of light (e.g., a second instance of the beam 126) toward a second target location of the material 122 to generate a second portion of the object 120. The second target location is near (e.g., abutting or adjacent to) the first target location such that the second beam of light passes through at least a portion of the atmospheric distortion region 128. For example, a portion of the material 122 removed at the second target location is contiguous with or directly adjacent to the portion of the material removed at the first target location. As another example during an additive process, the portion of the material fused at the first target location to form a first portion of the object 120 is directly adjacent to and fused to a second portion of the material 122 at the second target location.

The second beam of light is directed through the optical system 110, and the optical system 110 applies the optical correction 154 to the second beam of light. As a result, the second beam of light is pre-distorted to account for optical distortion in the atmospheric distortion region 128. In a particular example, operations continue in this manner iteratively. For example, the object 120 is formed using a series of process step, and a beam 126 from the process laser device(s) 104 is directed toward a target location of the material during each process step. Additionally, between process steps, the optical system 110 may be reconfigured to account for optical distortions in the atmospheric distortion region(s) 128 formed during one or more prior process steps. Adjusting for the optical distortion in the atmospheric distortion region 128 enables faster operation of the manufacturing system 100 since delay and/or retargeting of the laser device(s) 102 is not needed between process steps.

Although FIG. 1 illustrates the optical correction instructions 152 calculating the optical correction 154 as a conjugate phase-front shape 158 in other implementations, other optical correction calculations may be performed in addition to or instead of the conjugate phase-front shape calculations. For example, the sensor data 136 may include temperate or chemical constituent information sensed by the other sensor(s), and the sensor data 136 may be provided as input to a machine-learning model (e.g., a neural network) to determine the optical correction 154. In this example, the machine-learning model may be trained to estimate the optical correction 154 based on sensor data 136. As another example, the sensor data 136 can be compared to calibration data that maps particular sensor data values to parameters of the optical correction 154.

FIG. 2 is a diagram that illustrates a first example of the system 100 of FIG. 1 for an additive manufacturing system. In FIG. 2, the system 100 is configured as a resin-based additive manufacturing system. For example, in FIG. 2, the material 122 includes a resin that is cured (e.g., crosslinking of a polymer is initiated) by the beams 126 of light from the process laser device(s) 104. In this example, the actuators 160B are configured to adjust a depth of the object 120 within a reservoir 206 of the material 122 to enable a layer of the resin to overflow an upper portion of the object 120 to form a layer of uncured resin on top of the object. The beam 126 is subsequently directed to particular locations of the layer of uncured resin to selectively cure portions of the layer to form portions of the object 120. The object 120 is formed on a platform 202 that extends into the reservoir 206 and supports the object 120 as the object 120 is formed.

In the example illustrated in FIG. 2, the actuator(s) 160A are coupled to a targeting mirror(s) 204. The actuator(s) 160A move the targeting mirror(s) 204 to direct the beam 126 to a specified target location.

In the example illustrated in FIG. 2, the measurement laser device(s) 106 are positioned such that the beam 124 of light emitted by the measurement laser device(s) 106 passes through the atmospheric distortion region 128 and is detected by the sensors 130. Based on the sensor data 136 from the sensors 130, the controller 140 commands the optical system 110 to modify the beam 126 from the process laser device(s) 104 to account for optical distortion in the atmospheric distortion region 128. For example, the optical system 110 may apply an optical correction 154, such as a phase-front adjustment using the spatial light manipulator(s) 114, the dynamically adjustable lens(es) 116, or the dynamically adjustable mirror(s) 118 as illustrated in FIG. 1. In some implementations, after the process laser device(s) 104 direct a first beam 126 of light toward a first target location of the material 122 and form the atmospheric distortion region 128, the optical system 110 is adjusted based on the optical correction 154. In this example, the process laser device(s) 104 direct a second beam 126 of light toward a second target location of the material 122, and the optical system 110 applies the optical correction 154 to the second beam 126 of light. The optical correction 154 causes the second beam 126 of light to be pre-distorted in a manner that limits defocusing of the second beam 126 of light due to the local variation of the atmospheric index of refraction in the atmospheric distortion region 128.

FIG. 3 is a diagram that illustrates a second example of the system 100 of FIG. 1 for an additive manufacturing system. In FIG. 3, the system 100 corresponds to a metal powder bed fusion system, such as a selective laser melting system, a selective laser sintering system, or a direct metal laser sintering system. In FIG. 3, the system 100 includes a reservoir 308 of the material 122 and a build volume 310. The reservoir 308 includes a first platform 304 coupled to one of the actuators 160B, and the build volume 310 includes a second platform 302 coupled to another one of the actuators 160B. The material 122 includes fine particles, such as a metal powder or a polymer powder.

In the example illustrated in FIG. 3, the actuator(s) 160A are coupled to the targeting mirror(s) 204 and are configured to move the targeting mirror(s) 204 to direct the beam 126 toward a specified target location. In some implementations, after the process laser device(s) 104 direct a first beam 126 of light toward a first target location of the material 122 and form the atmospheric distortion region 128, the controller 140 determines the optical correction 154 to be applied by the optical system 110 when a subsequent beam 126 is directed toward a second target location of the material 122. The optical correction 154 causes the second beam 126 to be pre-distorted in a manner that limits defocusing of the second beam 126 due to the local variation of the atmospheric index of refraction in the atmospheric distortion region 128.

In FIG. 3, the measurement laser device(s) 106 are positioned such that the beam 124 of light emitted by the measurement laser device(s) 106 passes through the atmospheric distortion region 128 and is detected by the sensors 130. Based on the sensor data 136 from the sensors 130, the controller 140 commands the optical system 110 to modify the beam 126 from the process laser device(s) 104 to account for the optical distortion in the atmospheric distortion region 128.

During operations, a layer of the material 122 is formed in the build volume 310 by moving the first platform 304 up and moving a roller 306 or scraper across the reservoir 308 and the build volume 310 to form a thin, even layer of the material 122. The beam 126 is directed toward selected parts of the layer of material 122 to fuse adjacent portions of the material 122 to define a portion of the object 120. When a particular layer is done, the second platform 302 is moved down to make room for another layer of material, and the first platform 304 is moved up to enable the roller 306 or scraper to dispense another layer of the material 122.

Figure 4A:
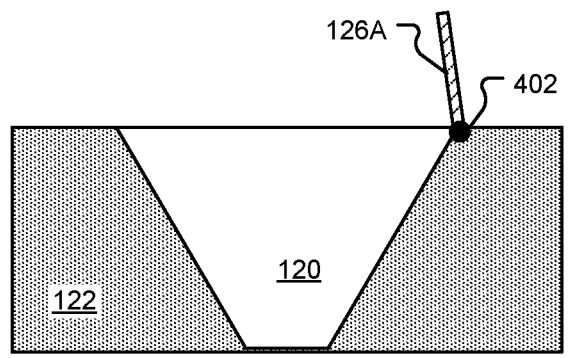
FIGS. 4A, 4B, and 4C are diagrams that illustrate stages during an additive fabrication process using the system of FIG. 1.
Figure 4B:
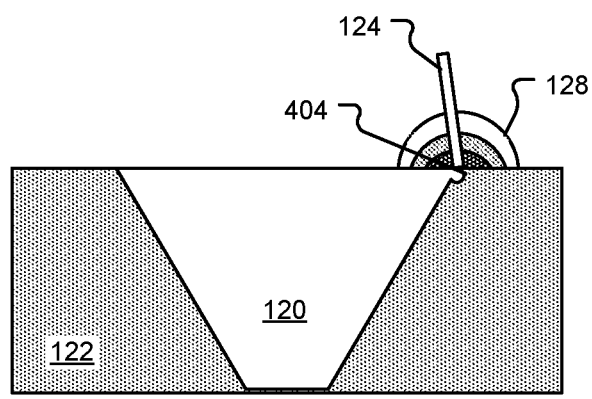
Figure 4C:
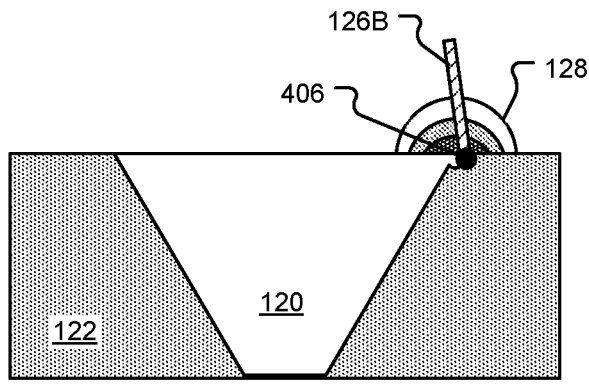

FIGS. 4A, 4B, and 4C illustrate stages during an additive manufacturing process using the system 100 of any of FIGS. 1-3. In FIG. 4A, a first beam 126A of light from the process laser device(s) 104 is directed toward a first target location 402 of the material 122. Interaction of the first beam 126A of light with the material 122 at the first target location 402 causes the material 122 at the first target location 402 to cure, sinter, melt together, or otherwise fuse to form at least a portion of the object 120 (e.g., a portion 404 illustrated in FIG. 4B). Additionally, interaction of the first beam 126A and the material 122 causes atmospheric distortions in the atmospheric distortion region 128 near the first target location 402. For example, the atmospheric distortions may be associated with or caused by thermal effects, evaporation or off-gassing, or other effects that cause local variations in the atmospheric refractive index.

In FIG. 4B, the measurement laser device(s) 106 direct the beam 124 through at least a portion of the atmospheric distortion region 128. In the particular example illustrated in FIG. 4B, the second beam 124 is directed toward the first target location 402. In other examples, such as illustrated in FIGS. 2 and 3, the beam 124 passes through the atmospheric distortion region 128 in a different manner.

The controller 140 of FIGS. 1-3 determines the optical correction 154 to account for the atmospheric distortions in the atmospheric distortion region 128 based on measurements associated with the beam 124 or based on other sensor data 136. The controller 140 commands configuration of the optical system 110 to account for the optical distortions in the atmospheric distortion region 128.

After the optical system 110 is configured to account for the optical distortions, as illustrated in FIG. 4C, the process laser devices 104 generates a second beam 126B of light, which is directed toward a second target location 406. The second target location 406 is adjacent to the first target location 402 of FIG. 4A. For example, directing the second beam 124 causes the second beam 126B to pass through at least a portion of the atmospheric distortion region 128. Additionally, in some implementations, interaction of the second beam 126B and the material 122 at the second target location 406 causes a portion of the material 122 to be fused to the first portion 404 of the object 120 generated by interaction of the first beam 126A of light with the material 122.

FIG. 5 is a diagram that illustrates an example of the system 100 of FIG. 1 for a subtractive manufacturing system. In FIG. 5, the system 100 corresponds to a laser cutting system or a laser engraving system. In FIG. 5, the material 122 is disposed on a platform 502 that is coupled to the actuator(s) 160B. The actuator(s) 160B are configured to move the platform 502 to align a target location with a pointing direction of the process laser device(s) 104. For example, the platform 502 and the actuator(s) 160B may include, correspond to, or be included within a positioning table, such as a XY table or an XYZ table.

Figure 6A:
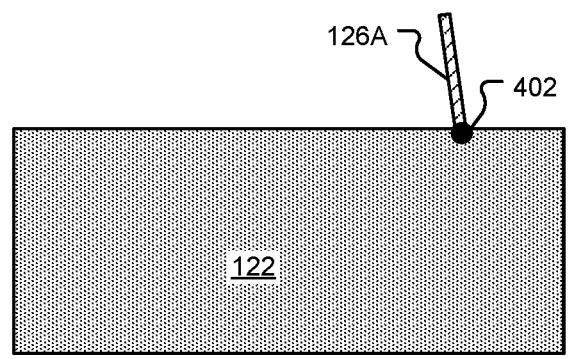
FIGS. 6A, 6B, and 6C are diagrams that illustrate stages during a subtractive fabrication process using the system of FIG. 1.
Figure 6B:
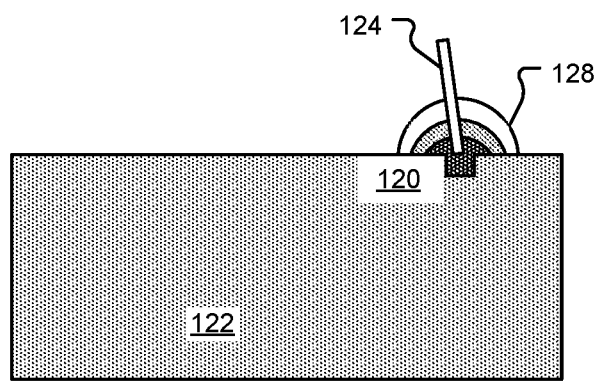
Figure 6C:
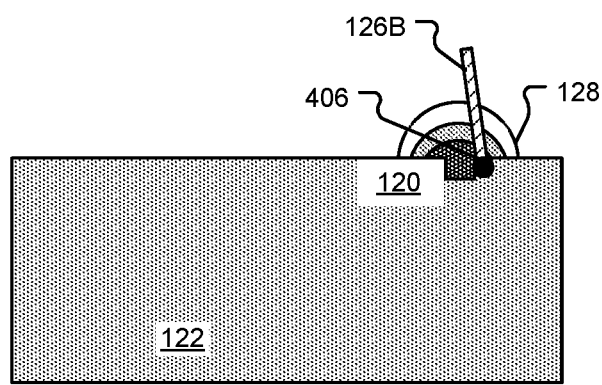

In FIG. 5, the material 122 is a solid (e.g., a sheet or blank), which may include a metal, a polymer, a biological material (such as wood), or another material. In some implementations, such as illustrated in FIG. 5, the system 100 is configured to cut the material to define the object 120. For example, in FIG. 5, the system 100 separates the material 122 into a waste portion 506 and the object 120. In other implementations, the system 100 is configured to etch or engrave the material to define the object 120. For example, as illustrated in FIGS. 6A-6C, the system 100 removes waste material (e.g., vaporizes or ablates the waste material) such that only the object 120 remains.

FIG. 5 illustrates an example in which the beam 126 emitted by the process laser device(s) 104 and the beam 124 emitted by the measurement laser device(s) 106 are coincident. For example, in FIG. 5, the beam 126 is reflected by one-way mirror(s) 504 toward the material 122, and the beam 124 passed through the one-way mirror(s) 504 to form a combined beam 508 that includes the beam 124 and the beam 126. In some implementations, the system 100 of FIG. 5 is configured such that the pointing directions of the process laser device(s) 104 and the measurement laser device(s) 106 are parallel rather than coincident. In some implementations, the process laser device(s) 104 and the measurement laser device(s) 106 operate at different times, so that only the beam 126 or the beam 124 is present during operation rather than the combined beam 508.

During operation, the actuator(s) 160B move the platform 502 to align a first target location of the material 122 with a beam (e.g., the beam 126 or the combined beam 508). The process laser device(s) 104 direct a first beam 126 of light toward the first target location of the material 122 to define at least a portion of the object 120. The first beam 126 also causes the atmospheric distortion region 128 to be formed. The controller 140 determines the optical correction 154 to be applied by the optical system 110 when a subsequent beam 126 is directed toward a second target location of the material 122. The optical correction 154 causes the second beam 126 to be pre-distorted in a manner that limits defocusing of the second beam 126 due to the local variation of the atmospheric index of refraction in the atmospheric distortion region 128.

In a particular aspect, the controller 140 determines the optical correction 154 based on a phase-front change induced in the beam 124 of the measurement laser device(s) 106 due to passage of the beam 124 through at least a portion of the atmospheric distortion region 128. Additionally, or alternatively, the controller 140 determines the optical correction 154 based on sensor data 136 from other sensors, such as the other sensors 134 of FIG. 1. The controller 140 commands the optical system 110 to modify the second beam 126 from the process laser device(s) 104 to account for optical distortion in the atmospheric distortion region 128. For example, the optical system 110 may apply the optical correction 154, such as a phase-front adjustment using spatial light manipulator(s) 114, dynamically adjustable lens(es) 116, or dynamically adjustable mirror(s) 118 as illustrated in FIG. 1.

The examples illustrated in FIGS. 2, 3, and 5 are illustrative and are not exhaustive. In other implementations, the actuators 160 control the relative positions of the laser device(s) 102 and the material 122 in a different manner than those illustrated. Additionally, aspects of one or more of FIGS. 2, 3, and 5 can be combined in a single system. To illustrate, the laser device(s) 102 can be arranged as illustrated in FIG. 5 when the system 100 is used for an additive manufacturing process. Further, in some implementations, the system 100 can be used for an additive manufacturing process when configured in a particular manner and with particular materials and can be used for a subtractive manufacturing process when configured in a different manner and/or with different materials.

FIGS. 6A, 6B, and 6C illustrate stages during a subtractive manufacturing process using the system 100 of FIG. 1 or FIG. 5. In FIG. 6A, a first beam 126A of light from the process laser device(s) 104 is directed toward a first target location 402 of the material 122. Interaction of the first beam 126A of light with the material 122 at the first target location 402 causes a portion of the material 122 at the first target location 402 to be removed (e.g., vaporized) to define at least a portion of the object 120 (e.g., an edge of the object 120 as illustrated in FIG. 6B). Additionally, interaction of the first beam 126A and the material 122 causes atmospheric distortions in the atmospheric distortion region 128 near the first target location 402. For example, the atmospheric distortions may be associated with or caused by thermal effects, evaporation or off-gassing, or other effects that cause local variations in the atmospheric refractive index.

In FIG. 6B, the measurement laser device(s) 106 direct the beam 124 through at least a portion of the atmospheric distortion region 128. In the particular example illustrated in FIG. 4B, the beam 124 is directed toward the first target location 402. In other examples, the beam 124 passes through the atmospheric distortion region 128 in a different manner.

The controller 140 of FIG. 1 or FIG. 5 determines the optical correction 154 to account for the atmospheric distortions in the atmospheric distortion region 128 based on measurements associated with the beams 124 or based on other sensor data 136. The controller 140 commands configuration of the optical system 110 to account for the optical distortions in the atmospheric distortion region 128.

After the optical system 110 is configured to account for the optical distortions, as illustrated in FIG. 6C, the process laser device(s) 104 generate a second beam 126B of light, which is directed toward a second target location 406. In some implementations, the second target location 406 is adjacent to the first target location 402 of FIG. 6A. For example, directing the second beam 126B causes the second beam 126B to pass through at least a portion of the atmospheric distortion region 128. Additionally, in some implementations, interaction of the second beam 126B and the material 122 at the second target location 406 causes a portion of the material 122 adjacent to the edge of the object 120 defined by the first beam 126A to be removed (e.g., the first beam 126A and the second beam 126B define adjacent or contiguous features of the object 120).

Figure 7:
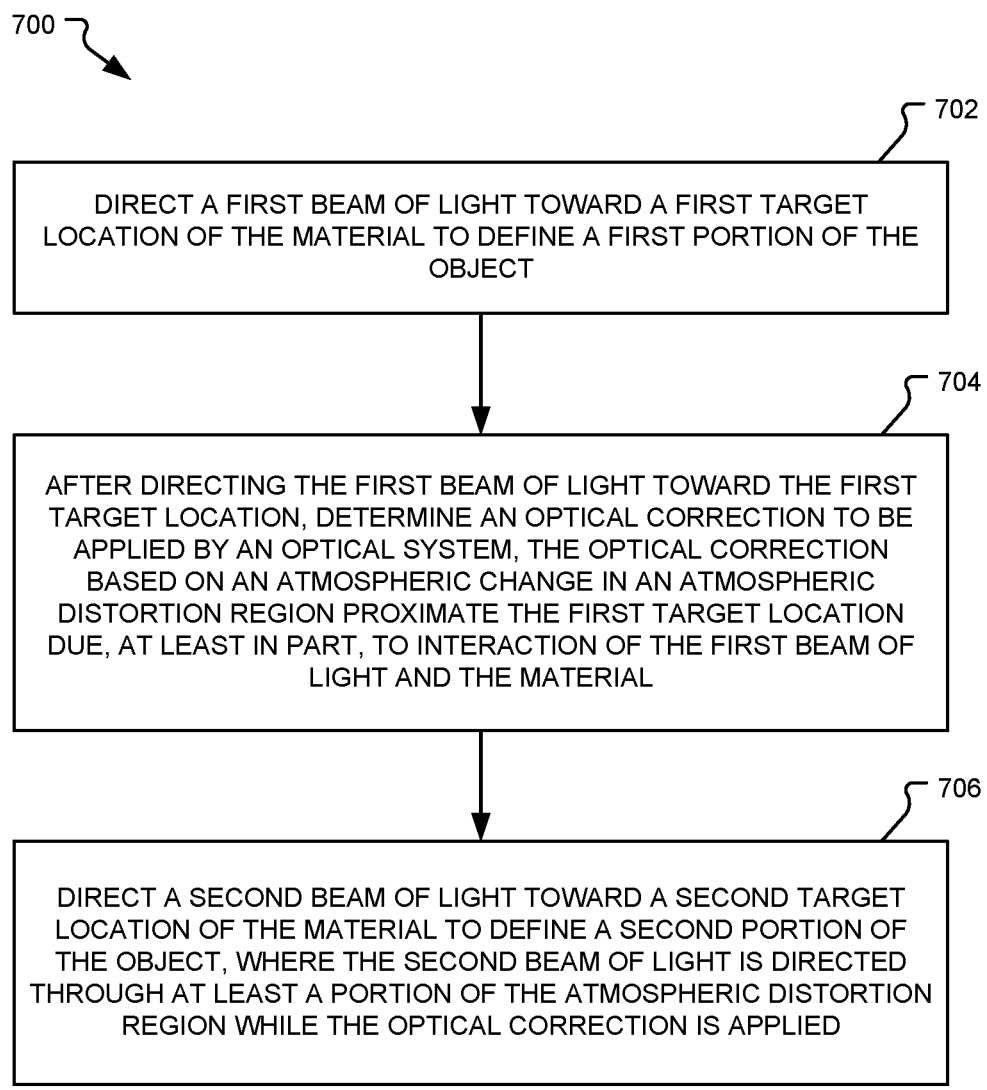
FIG. 7 is flow chart of an example of a method of fabricating an object using laser-based fabrication and using optical correction.

FIG. 7 is flow chart of an example of a method 700 of fabricating an object using laser-based fabrication and using optical correction. The method 700 may be initiated, performed, or controlled by the system 100 of any of FIG. 1-3 or 5 or a portion thereof, such as the controller 140.

The method 700 includes, at block 702, directing a first beam of light toward a first target location of the material to define a first portion of the object. In some implementations, the first beam of light defines the first portion of the object via an additive manufacturing process. For example, as illustrated in FIGS. 2, 3, and 4A-4C, the first beam of light (e.g., the beam 126A) defines the first portion of the object 120 by causing adjacent portions of the material 122 to fuse or adhere to one another to define the first portion of the object 120. In some implementations, the first beam of light defines the first portion of the object via a subtractive manufacturing process. For example, as illustrated in FIGS. 5 and 6A-6C, the first beam of light (e.g., the beam 126A) defines the first portion of the object 120 by removing portions of the material 122 such that remaining portions of the material 122 define the first portion of the object 120.

According to a particular aspect, interaction of the first beam of light and the material also causes atmospheric change in an atmospheric distortion region proximate the first target location. For example, the atmospheric changes may be due to thermal changes within the atmospheric distortion region, off-gassing of portions of the material, or both.

The method 700 also includes, at block 704, after directing the first beam of light toward the first target location, determining an optical correction to be applied by an optical system. The optical correction is based on the atmospheric change in the atmospheric distortion region proximate the first target location due, at least in part, to interaction of the first beam of light and the material. For example, the atmospheric change may result in local variation of an atmospheric index of refraction within the atmospheric distortion region, and the optical correction causes the second beam of light to be distorted (e.g., pre-distorted) in a manner that limits defocusing of the second beam of light due to the local variation of the atmospheric index of refraction. To illustrate, the atmospheric change may cause a phase-front change that affects the second beam of light. The optical correction may distort the second beam of light using a conjugate of the phase-front change such that the phase-front change and the conjugate phase-front change substantially cancel one another out as the second beam passes through the atmospheric distortion region resulting in a substantially planar phase-front of the second beam as the second beam strikes the second target location.

The method 700 further includes, at block 706, directing the second beam of light toward the second target location of the material to define a second portion of the object. The second beam of light is directed through at least a portion of the atmospheric distortion region while the optical correction is applied. Like the first beam, the second beam can additively define a portion of the object or substantively define the portion of the object. For example, in an additive manufacturing process, the second beam of light may define the second portion of the object by causing portions of the material to fuse or adhere to the first portion of the object defined by the first beam. As another example, in a subtractive manufacturing process, the second beam of light may define the second portion of the object by removing a portion of the material that is directly adjacent to the first portion of the object defined by the first beam.

Figure 8:
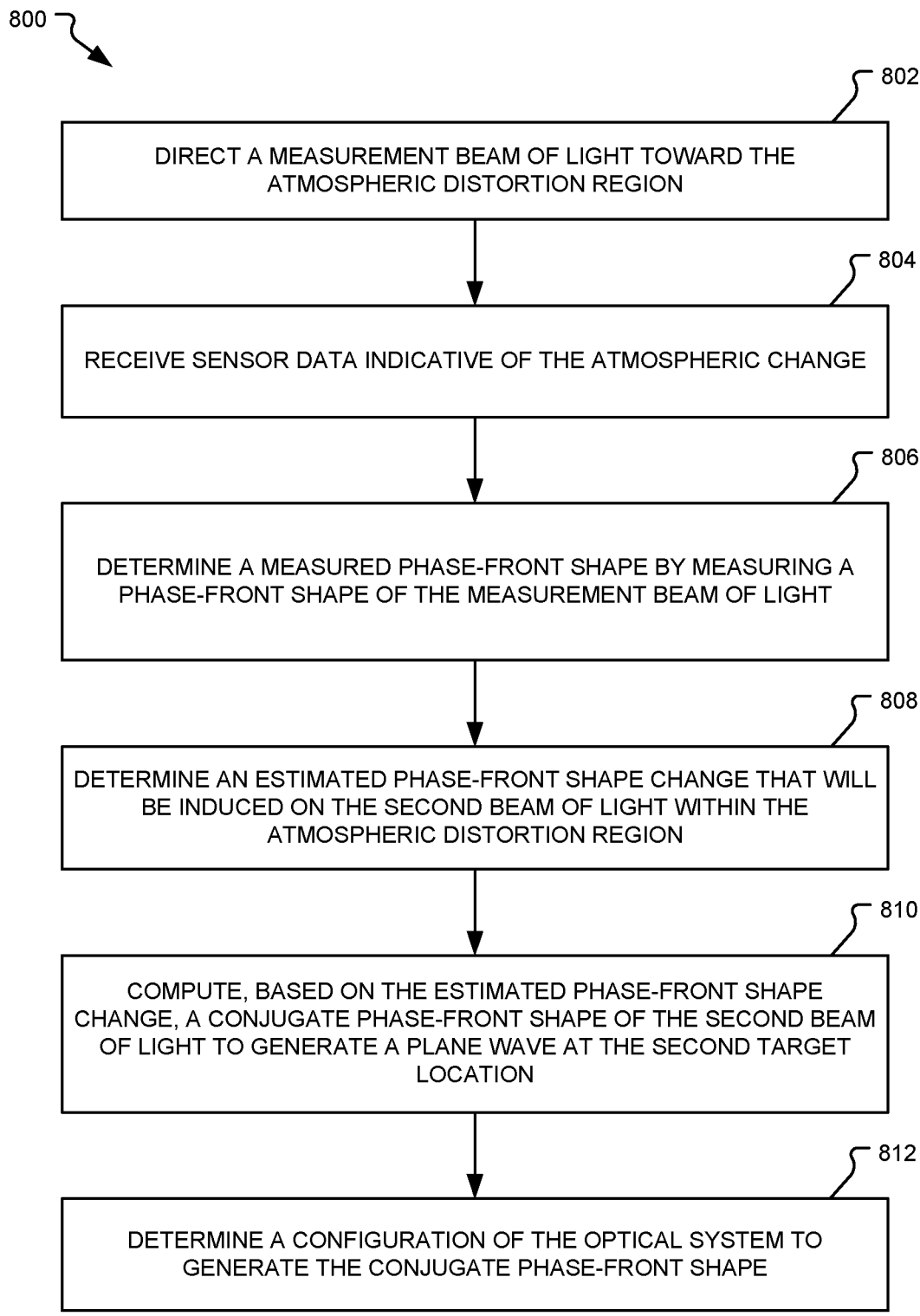
FIG. 8 is flow chart of an example of a method of determining an optical correction for a laser-based fabrication process.

FIG. 8 is flow chart of an example of a method 800 of determining the optical correction for a laser-based fabrication process. For example, the method 800 may be used to perform the operations of block 704 of FIG. 7. The method 800 may be initiated, performed, or controlled by the system 100 of any of FIG. 1-3 or 5 or a portion thereof, such as the controller 140.

The method 800 includes, at block 802, directing a measurement beam of light toward an atmospheric distortion region. For example, the atmospheric distortion region may be caused by interaction of a process beam of light (e.g., the beam 126) with a material (e.g., the material 122) as described above. In a particular aspect, the measurement beam of light has one or more beam characteristics distinct from the process beam of light. For example, the one or more beam characteristics that are distinct may include at least one of a wavelength, an intensity, a focal point, a duty cycle, a beam power, a beam shape, or a pulse characteristics. To illustrate, in a particular implementation, the process beam of light has a first wavelength, and the measurement beam of light has a second wavelength that is shorter than with the first wavelength.

The method 800 also includes, at block 804, receiving sensor data indicative of the atmospheric change. For example, the controller 140 of FIG. 1 receives the sensor data 136 from the sensors 130.

In the particular implementations illustrated in FIG. 8, the method 800 further includes, at block 806, determining a measured phase-front shape by measuring a phase-front shape of the measurement beam of light. For example, the phase-front shape may be measured based on the sensor data 136, or the sensor data 136 may indicate the measured phase-front shape.

The method 800 also includes, at block 808, determining an estimated phase-front shape change that will be induced on the second beam of light within the atmospheric distortion region. For example, the optical correction instructions 152 of FIG. 1 may be executed by the processor(s) 142 to determine the phase-front shape change 156 based on the sensor data 136.

The method 800 further includes, at block 810, computing, based on the estimated phase-front shape change, a conjugate phase-front shape of the second beam of light to generate a plane wave at the second target location. For example, the optical correction instructions 152 of FIG. 1 may be executed by the processor(s) 142 to determine the conjugate phase-front shape based on the phase-front shape change 156.

The method 800 also includes, at block 812, determining a configuration of the optical system to generate the conjugate phase-front shape. For example, the optical correction instructions 152 of FIG. 1 may be executed by the processor(s) 142 to determine the command(s) 174 to cause the optical system 110 to be configured to generate the conjugate phase-front shape 158.

In some implementations, the sensor data 136 of FIG. 1 indicates other aspects of the atmospheric change in addition to or instead of measurements that indicate the phase-front shape. For example, the other sensors 134 may measure temperature variations within the atmospheric distortion region 128, and information descriptive of the temperature variations can be used determine the optical correction 154. In such implementations, the optical correction instructions 152 of FIG. 1 may be executed by the processor(s) 142 to determine the optical correction 154 based, at least in part, on the sensor data 136 from the other sensors 134. For example, the memory 144 may store calibration data or a machine-learning model (e.g., a neural network) that maps values of the sensor data 136 from the other sensors 134 to corresponding optical correction configurations of the optical system 110. In such implementations, simpler sensors, such as temperature sensors, can be used rather than more complicated phase-front sensors 132. Additionally, in such implementations, computational resources used to compute the optical correction 154 may be reduced relative to computation resources used to calculate the phase-front shape change 156 and the conjugate phase-front shape 158. However, additional time and resource may be used initially to generate the calibration data and or to train the machine-learning model.

Figure 9:
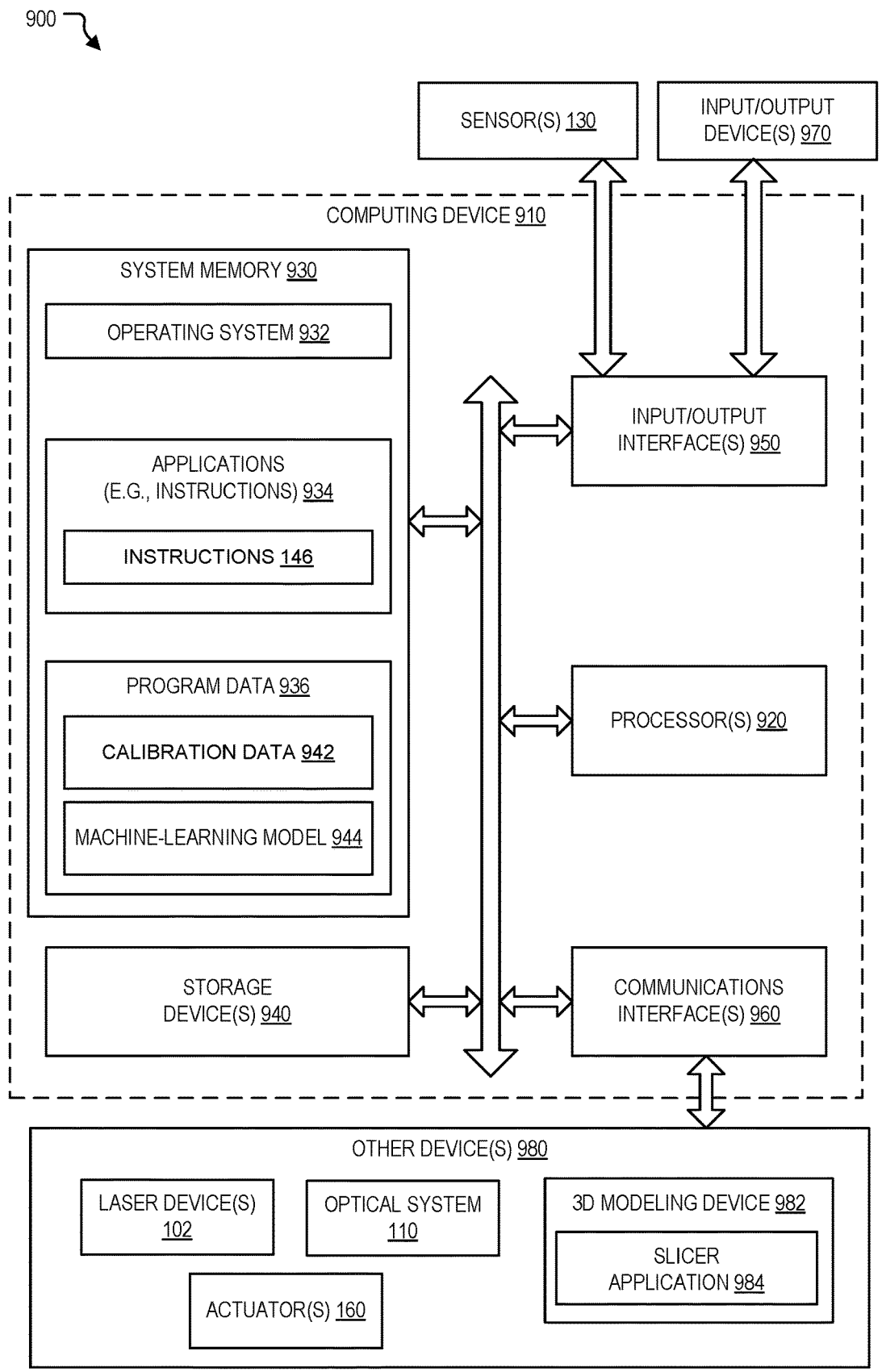
FIG. 9 is a block diagram of a computing environment including a computing device configured to support aspects of laser-based fabrication of an object using optical correction.

FIG. 9 is a block diagram of a computing environment 900 including a computing device 910 configured to support aspects of laser-based fabrication of an object using optical correction. In the particular implementation illustrated in FIG. 9, the computing device 910 may include, correspond to, or be included within the controller 140 of FIGS. 1-3 and 5. Alternatively, the computing device 910 may support operation of the system 100, such as by performing some of the calculations to determine the optical correction 154 or providing machine instructions to the controller 140 that are used to determine the commands 170 or 172. The computing device 910 is configured to support aspects of computer-implemented methods and computer-executable program instructions (or code) according to the present disclosure. For example, the computing device 910, or portions thereof, is configured to execute instructions 146 to initiate, perform, or control one or more operations described with reference to FIGS. 1-8.

The computing device 910 includes one or more processors 920, which may include or correspond to the processor(s) 142 of FIG. 1 or may be distinct from the processor(s) 142 of FIG. 1. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. In the example illustrated in FIG. 9, the system memory 930 stores program data 936, such as calibration data 942, a machine-learning model 944, or both, which may be used to determine the optical correction 154 of FIG. 1.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8, such as the instructions 146. Additionally, or in the alternative, the applications 934 may include a slicer application 984.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible (e.g., non-transitory) computer-readable media. In this context, tangible computer-readable media refers to a physical device or composition of matter not merely a signal. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays, including some combination of buttons, keyboards, pointing devices, displays, speakers, microphones, touch screens, and other devices. In some implementations, the sensor(s) 130 communicate with the computing device 910 via the input/output interface(s) 950.

The processor(s) 920 are configured to communicate with other devices 980 (e.g., other computing devices or the controller 140) via the one or more communications interfaces 960. For example, the communications interface(s) 960 can include a wired or wireless network interface. The other devices 980 can include, for example, a 3D modeling device 982. In some implementations, the 3D modeling device 982 includes the slicer application 984, and the 3D modeling device 982 sends machine instructions (e.g., G-code) to the computing device 910 via the communication interface(s) 960. In other implementations, the 3D modeling device 982 sends a 3D model of the object 120 of FIG. 1 to the computing device 910 via the communication interface(s) 960, and the applications 934 include the slicer application 984, which the processor(s) 920 execute to determine the machine instructions.

In the example illustrated in FIG. 9, the computing device 910 can communicate (e.g., send commands to) the laser device(s) 102, the optical system 110, the actuators 160, or a combination thereof, via the communication interface(s) 960. In other examples, the computing device 910 communicates (e.g., send commands to) the laser device(s) 102, the optical system 110, the actuators 160, or a combination thereof, via the input/output interface(s) 950.

In some implementations, a non-transitory computer readable medium stores instructions that, when executed by one or more processors, cause the one or more processors to initiate, perform, or control operations to perform part or all of the functionality described above. For example, the instructions may be executable to implement one or more of the operations or methods described with reference to FIGS. 1-8. In some implementations, part or all of one or more of the operations or methods described with reference to FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Particular aspects of the disclosure are described below in several sets of interrelated clauses.

According to Clause 1, a method of forming an object from a material includes directing a first beam of light toward a first target location of the material to define a first portion of the object; after directing the first beam of light toward the first target location, determining an optical correction to be applied by an optical system, the optical correction based on an atmospheric change in an atmospheric distortion region proximate the first target location due, at least in part, to interaction of the first beam of light and the material; and directing a second beam of light toward a second target location of the material to define a second portion of the object, wherein the second beam of light is directed through at least a portion of the atmospheric distortion region while the optical correction is applied.

Clause 2 includes the method of Clause 1 wherein the first beam of light defines the first portion of the object by causing adjacent portions of the material to fuse or adhere to one another to define the first portion of the object.

Clause 3 includes the method of Clause 1 wherein the first beam of light defines the first portion of the object by removing portions of the material such that remaining portions of the material define the first portion of the object.

Clause 4 includes the method of any of Clauses 1 to 3 wherein the first beam of light includes a laser pulse.

Clause 5 includes the method of any of Clauses 1 to 4 wherein the first beam of light defines the first portion of the object via an additive manufacturing process.

Clause 6 includes the method of any of Clauses 1 to 4 wherein the first beam of light defines the first portion of the object via a subtractive manufacturing process.

Clause 7 includes the method of any of Clauses 1 to 6 wherein the atmospheric change results in local variation of an atmospheric index of refraction within the atmospheric distortion region, and wherein the optical correction distorts the second beam of light to limit defocusing of the second beam of light due to the local variation of the atmospheric index of refraction.

Clause 8 includes the method of Clauses 1 to 7 and further includes receiving sensor data indicative of the atmospheric change, wherein the optical correction is determined based on the sensor data.

Clause 9 includes the method of Clauses 1 to 8 wherein interaction of the first beam of light and the material causes the atmospheric change due to thermal changes within the atmospheric distortion region, off-gassing of portions of the material, or both.

Clause 10 includes the method of method of Clauses 1 to 9 wherein determining the optical correction includes determining an estimated phase-front shape change that will be induced on the second beam of light within the atmospheric distortion region; computing, based on the estimated phase-front shape change, a conjugate phase-front shape of the second beam of light to generate a plane wave at the second target location; and determining a configuration of the optical system to generate the conjugate phase-front shape.

Clause 11 includes the method of Clause 10 and further includes directing a measurement beam of light toward the atmospheric distortion region; and determining a measured phase-front shape by measuring a phase-front shape of the measurement beam of light, wherein the phase-front shape change of the second beam of light is estimated based on the measured phase-front shape of the measurement beam of light.

Clause 12 includes the method of Clause 11 wherein the measurement beam of light has one or more beam characteristics distinct from the first beam of light and distinct from the second beam of light, wherein the one or more beam characteristics include at least one of a wavelength, an intensity, a focal point, a duty cycle, a beam power, a beam shape, and a pulse characteristics.

Clause 13 includes the method of Clause 11 or Clause 12 wherein the measurement beam of light is directed coincident with the first beam of light.

Clause 14 includes the method of method of Clauses 11 to 13 wherein the first beam of light has a first wavelength and the measurement beam of light has a second wavelength, wherein the second wavelength is shorter than with the first wavelength.

According to Clause 15 a system for forming an object from a material includes one or more laser devices configured to direct light toward a material to modify the material to define portions of an object; an optical system coupled to the one or more laser devices and configured to perform optical correction of the light; and a controller coupled to the optical system and configured to, after the one or more laser devices direct one or more first beams of light toward a first target location of the material to define a first portion of the object: determine an optical correction to be applied by the optical system, the optical correction based on an atmospheric change in an atmospheric distortion region proximate the first target location due, at least in part, to interaction of the one or more first beams of light and the material; and cause the optical system to apply the optical correction to a second beam of light from the one or more laser devices, wherein the second beam of light is directed through at least a portion of the atmospheric distortion region toward a second target location on the material to define a second portion of the object.

Clause 16 includes the system of Clause 15 and further includes one or more sensors coupled to the controller and configured to generate sensor data indicative of the atmospheric change in the atmospheric distortion region.

Clause 17 includes the system of Clause 15 or Clause 16 and further includes one or more measurement laser devices configured to direct one or more measurement beams of light toward the atmospheric distortion region; and one or more phase-front sensors configured to generate data indicative of a phase-front shape change induced in the one or more measurement beams of light due to interaction with the atmospheric distortion region, wherein the controller determines the optical correction based on the phase-front shape change.

Clause 18 includes the system of Clause 17 wherein a first laser device of the one or more laser devices is configured to generate a pulsed beam, and wherein a particular measurement laser of the one or more measurement laser devices is configured to generate continuous beam.

Clause 19 includes the system of Clause 17 or Clause 18 wherein the optical system includes a phase-front shape adjustment system to modify a phase-front shape of the one or more beams of light emitted by the one or more laser devices.

Clause 20 includes the system of Clause 19 wherein the phase-front shape adjustment system includes one or more spatial light manipulators, a plurality of dynamically adjustable lenses, plurality of dynamically adjustable mirrors, or a combination thereof.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of forming an object from a material, the method comprising:
   directing a first beam of light toward a first target location of the material to define a first portion of the object;
   after directing the first beam of light toward the first target location:
      determining an estimated phase-front shape change that will be induced on a second beam of light within an atmospheric distortion region proximate the first target location; and
      determining an optical correction to be applied by an optical system, the optical correction based on an atmospheric change in the atmospheric distortion region due, at least in part, to interaction of the first beam of light and the material, wherein the optical correction is based on the estimated phase-front shape change; and
   directing the second beam of light toward a second target location of the material to define a second portion of the object, wherein the second beam of light is directed through at least a portion of the atmospheric distortion region while the optical correction is applied.

2. The method of claim 1, wherein the first beam of light defines the first portion of the object by causing adjacent portions of the material to fuse or adhere to one another to define the first portion of the object.

3. The method of claim 1, wherein the first beam of light defines the first portion of the object by removing portions of the material such that remaining portions of the material define the first portion of the object.

4. The method of claim 1, wherein the first beam of light comprises a laser pulse.

5. The method of claim 1, wherein the first beam of light defines the first portion of the object via an additive manufacturing process.

6. The method of claim 1, wherein the first beam of light defines the first portion of the object via a subtractive manufacturing process.

7. The method of claim 1, wherein the atmospheric change results in local variation of an atmospheric index of refraction within the atmospheric distortion region, and wherein the optical correction distorts the second beam of light to limit defocusing of the second beam of light due to the local variation of the atmospheric index of refraction.

8. The method of claim 1, further comprising receiving sensor data indicative of the atmospheric change, wherein the optical correction is determined based on the sensor data.

9. The method of claim 1, wherein interaction of the first beam of light and the material causes the atmospheric change due to thermal changes within the atmospheric distortion region, off-gassing of portions of the material, or both.

10. The method of claim 1, wherein determining the optical correction comprises:
    computing, based on the estimated phase-front shape change, a conjugate phase-front shape of the second beam of light to generate a plane wave at the second target location; and
    determining a configuration of the optical system to generate the conjugate phase-front shape.

11. The method of claim 10, further comprising:
    directing a measurement beam of light toward the atmospheric distortion region; and
    determining a measured phase-front shape by measuring a phase-front shape of the measurement beam of light, wherein the estimated phase-front shape change of the second beam of light is estimated based on the measured phase-front shape of the measurement beam of light.

12. The method of claim 11, wherein the measurement beam of light has one or more beam characteristics distinct from the first beam of light and distinct from the second beam of light, wherein the one or more beam characteristics comprise at least one of a wavelength, an intensity, a focal point, a duty cycle, a beam power, a beam shape, and a pulse characteristic.

13. The method of claim 11, wherein the measurement beam of light is directed coincident with the first beam of light.

14. The method of claim 11, wherein the first beam of light has a first wavelength and the measurement beam of light has a second wavelength, wherein the second wavelength is shorter than with the first wavelength.

15. A system for forming an object from a material, the system comprising:
    one or more laser devices configured to direct light toward a material to modify the material to define portions of an object;
    an optical system coupled to the one or more laser devices and configured to perform optical correction of the light; and
    a controller coupled to the optical system and configured to, after the one or more laser devices direct one or more first beams of light toward a first target location of the material to define a first portion of the object:
  determine an estimated phase-front shape change that will be induced on a second beam of light within an atmospheric distortion region proximate the first target location;
  determine an optical correction to be applied by the optical system, the optical correction based on an atmospheric change in the atmospheric distortion region due, at least in part, to interaction of the one or more first beams of light and the material, wherein the optical correction is based on the estimated phase-front shape change; and
  cause the optical system to apply the optical correction to the second beam of light from the one or more laser devices, wherein the second beam of light is directed through at least a portion of the atmospheric distortion region toward a second target location on the material to define a second portion of the object.

16. The system of claim 15, further comprising one or more sensors coupled to the controller and configured to generate sensor data indicative of the atmospheric change in the atmospheric distortion region.

17. The system of claim 15, further comprising:
  one or more measurement laser devices configured to direct one or more measurement beams of light toward the atmospheric distortion region; and
  one or more phase-front sensors configured to generate data indicative of the estimated phase-front shape change.

18. The system of claim 17, wherein a first laser device of the one or more laser devices is configured to generate a pulsed beam, and wherein a particular measurement laser of the one or more measurement laser devices is configured to generate a continuous beam.

19. The system of claim 17, wherein the optical system includes a phase-front shape adjustment system to modify a phase-front shape of one or more beams of light emitted by the one or more laser devices.

20. The system of claim 19, wherein the phase-front shape adjustment system includes one or more spatial light manipulators, a plurality of dynamically adjustable lenses, a plurality of dynamically adjustable mirrors, or a combination thereof.

* * * * *